US012326568B2

(12) United States Patent
Wang et al.

(10) Patent No.: US 12,326,568 B2
(45) Date of Patent: Jun. 10, 2025

(54) FACIAL INTERFACE

(71) Applicant: Apple Inc., Cupertino, CA (US)

(72) Inventors: Paul X. Wang, Cupertino, CA (US);
Ian A. Guy, Santa Cruz, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/456,457

(22) Filed: Aug. 25, 2023

(65) Prior Publication Data

US 2024/0103284 A1 Mar. 28, 2024

Related U.S. Application Data

(60) Provisional application No. 63/376,766, filed on Sep. 22, 2022.

(51) Int. Cl.
G02B 27/01 (2006.01)

(52) U.S. Cl.
CPC ..... G02B 27/0176 (2013.01); G02B 27/0101 (2013.01); G02B 27/017 (2013.01); *G02B 2027/0138* (2013.01); *G02B 2027/014* (2013.01)

(58) Field of Classification Search
CPC .... G02B 27/017–0176; G02B 27/0101; G02B 2027/0138–014; G06F 3/011–015
See application file for complete search history.

(56) References Cited

U.S. PATENT DOCUMENTS

| | | | |
|---|---|---|---|
| 9,424,678 B1 * | 8/2016 | Enakiev | G01B 11/24 |
| 10,248,842 B1 * | 4/2019 | Bardagjy | G06V 10/60 |
| 10,895,751 B1 * | 1/2021 | Yee | G02B 27/028 |
| 11,217,036 B1 * | 1/2022 | Albuz | G06T 19/20 |
| 2018/0158246 A1 * | 6/2018 | Grau | G06T 3/18 |
| 2020/0233220 A1 * | 7/2020 | Strongwater | G06V 40/176 |
| 2020/0233453 A1 * | 7/2020 | Hatfield | G06F 3/011 |
| 2021/0041706 A1 | 2/2021 | Hatfield et al. | |
| 2022/0026724 A1 | 1/2022 | Law et al. | |
| 2023/0051409 A1 * | 2/2023 | Du | H04N 7/157 |
| 2023/0205265 A1 * | 6/2023 | Oka | G02B 27/0176 |
| 2024/0078731 A1 * | 3/2024 | Beith | G06T 13/205 |

FOREIGN PATENT DOCUMENTS

| | | |
|---|---|---|
| CN | 113874777 A | 12/2021 |
| EP | 4127816 A1 | 2/2023 |

OTHER PUBLICATIONS 23198293.5, Extended European Search Report, May 17, 2024, 10 pages.

\* cited by examiner

*Primary Examiner* — Hang Lin
(74) *Attorney, Agent, or Firm* — Dorsey & Whitney LLP (57) ABSTRACT

A head-mountable display with a light shield that can be modified to reduce the friction against softer more pliable portions of a user's face when the head-mountable display is worn by the user. The head-mountable display can also be configured to capture images of the user's face when it is worn and then create an avatar of the user's face. The avatar can be digitally adjusted to reflect an avatar that more closely aligns with the user's desired configuration.

10 Claims, 8 Drawing Sheets

FIG. 14

FACIAL INTERFACE

CROSS-REFERENCE TO RELATED APPLICATION(S)

This claims priority to U.S. Provisional Patent Application No. 63/376,766, filed 22 Sep. 2022, and entitled "Facial Interface," the entire disclosure of which is hereby incorporated by reference.

FIELD

The examples described in the present disclosure relate generally to wearable electronic devices. More particularly, the present disclosure relates to head-mountable displays (HDMs).

BACKGROUND

Wearable electronic devices, including head-mountable displays (HMDs) are increasingly used in a wide variety of applications and settings, including aviation, engineering, medicine, military applications, and video gaming. HMDs are intended to provide the user with an interactive and immersive experience, for example, through visual and audio stimulation. HMD's can be worn for extended periods of time depending on the application. As such, the HMD's should provide the user with the most comfort possible during use. Additionally, many users of HMD's express dissatisfaction with their associated avatars while using the HMDs.

SUMMARY

Various examples can be directed to a head-mountable device that has a display unit and a light shield that extends from the display unit. The light shield can define a facial interface region of the device. The device can also have a camera within the display unit that is directed at the facial interface region. The camera can capture a first image and a second image. The device can also have a controller that is electrically coupled to the camera and to a display. The controller can generate a third image based on a visual difference between the first image and the second image and cause the display to project the third image.

In other examples, the display unit houses the display. In some examples, the display is located in a separate external device and the controller transmits the third image to the separate external device via a transmitter. The external device can be any device that is not physically a part of the HMD system such as a mobile phone, any type of external monitor or another HMD system or portion thereof. In various aspects, the transmitter transmits the third image via a wireless transmission. According to some examples, the device has a head strap connected to the display unit. In other examples, the device has an auxiliary strap with a first end connected to the display unit and the second end connected to the head strap. In some examples, the device has a number of independent pressure elements located within the light shield. In various aspects, the independent pressure elements define a portion of the facial interface region.

Other examples can be directed to a facial interface component for a head-mountable display, where the facial interface component has a body extending from a surface of a housing. The body can have a first portion and a second portion. When the head-mountable display is donned by a user, the first portion engages with a face above the eyes generating a first frictional force. Additionally, the second portion engages with the face below the eyes with a second frictional force.

According to some examples, the facial interface component can have a number of independent pressure elements located within the first portion of the body. Each of the independent pressure elements can be configured to engage with the face and generate the first frictional force. In other examples, each of the independent pressure elements have a stiffness greater than that of a material forming the body. In some examples, the second frictional force is a lower friction than the first frictional force. In various aspects, the first portion is formed from a first material and the second portion is formed from a second material. According to some examples, the second material has a surface texture that generates the second frictional force.

Other examples can be directed to a wearable electronic device with a head-mountable display unit and a head strap connected to the head-mountable display unit. The head-mountable display unit can have a facial interface component. The facial interface component can be defined by an upper portion and a lower portion. In some examples, the device can have a number of pressure generation elements located within the upper portion. Each of the plurality of pressure generation elements can be configured to engage with a face to create a frictional datum above the eyes. The plurality of pressure generating elements can be configured to hold the head-mountable display unit against a face with a first frictional force, and the lower portion can be configured to hold the head-mountable display unit against the face with a second frictional force, different than the first frictional force.

In various aspects, the pressure generation elements have a greater stiffness than that of the facial interface component. According to some examples, the lower portion of the facial interface component is formed from a first material and the upper portion of the facial interface component is formed from a second material. In other examples, the head strap is configured to wrap around a head. In some examples, an auxiliary strap with a first end connected to the head-mountable display and a second end connected to the head strap. In at least one example, the auxiliary strap is configured to extend over a top of a head.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative examples illustrated in the accompanying drawings. It should be understood that the following descriptions are not intended to limit the examples to one preferred example. To the contrary, it is intended to cover alternatives, modifications, and equivalents as can be included within the spirit and scope of the described examples as defined by the appended claims.

As virtual reality (VR) and mixed reality (MR) become more ubiquitous, the demand for user friendly head-mountable devices with quality components increases. Traditionally, VR/MR systems have included devices that have a wearable display component, often referred to as a head-mountable display (HMD) with a primary focus being on the visual field of the user while wearing the device. However, many traditional systems fail to focus on the overall comfort of the user as well as the latent effects of wearing the HMD over time.

According to various examples described herein, an HMD can have a light shield that surrounds the opening to the HMD that interfaces with the user. The light shield can support the HMD by applying a force against the face of the user. The light shield, and the HMD, typically cover the eyes of the user while interfacing with the area above the eyes and the cheeks or facial region below the eyes. HMDs can be equipped with cameras for capturing images of the user's face, which is otherwise hidden from view by the device itself. Those images can be presented to others interacting with the user as the user's avatar. That is, while wearing the HMD, a user's face can be presented or displayed so that others interacting with the user can see and identify the user's face, even while donning the HMD. This representation or "avatar" of the user displayed by the HMD can create a more natural user experience, including more natural experiences for others interacting with the user donning the HMD.

Examples of HMDs described herein can include certain components physically interacting with and pressing against a user's face. In one example, a light shield can press against the user's face to create friction to hold the HMD on the user's head as well as block out external light from reaching the user's eyes. In order to create the natural, enhanced experience enabled by the displayed avatar, devices described herein can include components and features to recreate a user's natural face as it would appear if unaffected by any HMD or HMD component pressing against the user's face.

Some examples can be directed to the use of different materials or structures within the light shield that help to create a frictional datum or different frictional forces on the users face. For example, some light shields may be formed from two different types of materials where an upper portion is of a higher friction material than the lower portion. This would enable the light shield to engage with the user's face while not adding unwanted stress or strain to the user's soft tissues that are typically around the eyes and below the eyes. This may allow the user to have normal facial expressions that are more in-line with their typical facial expressions without the added forces from a light shield.

Other examples can include structural elements that are hidden within the light shield so that they are not readily visible. The structural elements can act as pressure points that generate the frictional datum or provide more frictional support against the upper portion of the user's face. This can be similar to the example above in that the pressure points or pressure elements can relieve any unwanted stress and friction on the user's face below the eyes. Similarly, this can allow the user to express facial emotions without interference from the light shield.

Additionally, some examples can be directed to the use of image capture systems that can be used in conjunction with computer processing systems to adjust the avatar as well as the transmitted image, which can give the avatar or transmitted image a more desired appearance. This can be used in conjunction with any of the frictional reduction components of the light shield and can be used to create a more natural appearance in the user's avatar.

These and other examples are discussed below with reference to FIGS. 1-14. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
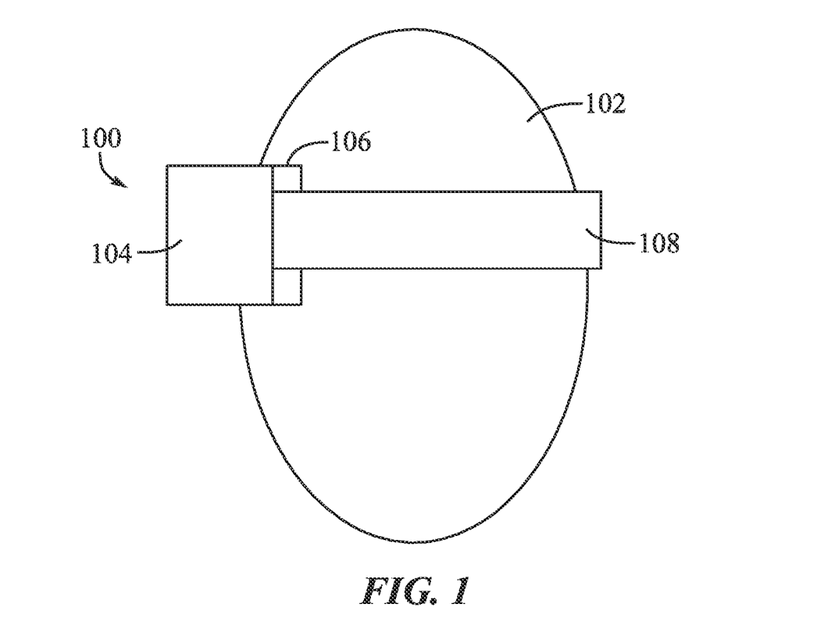
FIG. 1 conceptually illustrates a side view of an example of a head-mountable display positioned on a user's head.

FIG. 1 illustrates a HMD system 100 that can be worn by a user 102. The display system 100 can have a display unit 104 that interfaces with the users 102 at a facial interface component 106. The facial interface component 106 can act as a light shield that helps to reduce the amount of ambient light that enters into the display unit 104 during use. To help position the display unit 104 on the user's face, the HMD system 100 can have a head strap 108 that is tensioned between the user 102 and the display unit 104.

Figure 2:
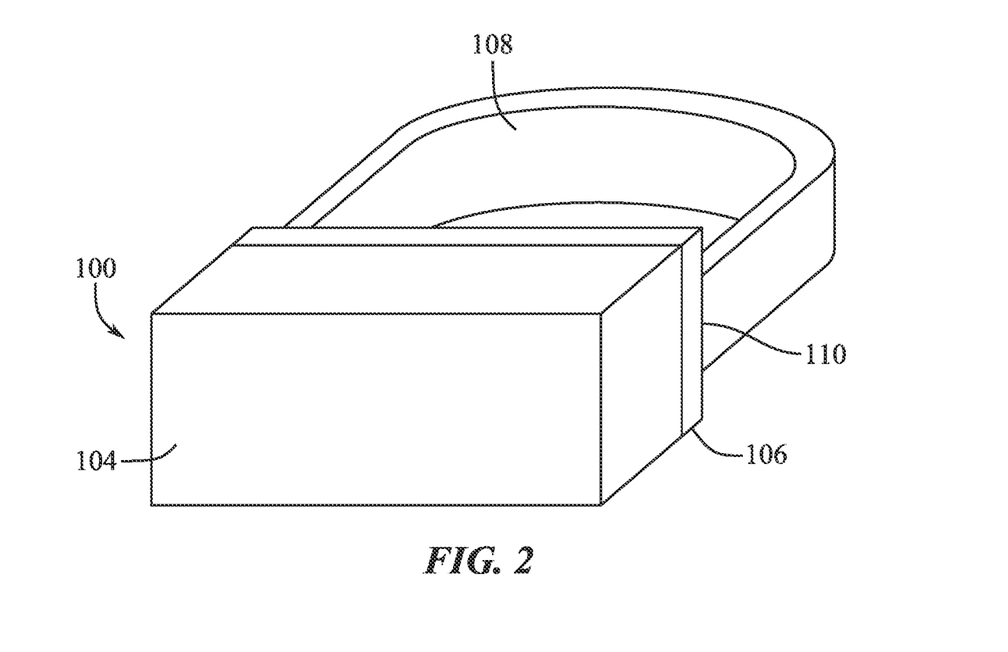
FIG. 2 conceptually illustrates an isometric view of an example of a head mounted display.

FIG. 2 further illustrates a HMD system 100 that is not installed on a person. In accordance with various examples, the system 100 can have a number of different components that allow for a more comfortable experience for the user. The head strap 108, for example, can be made of any number of different materials and can take on any suitable form that makes the use of the system 100 more comfortable for the user. Some examples of the head strap 108 can be an elastic type material that stretches around the user's head to apply a tension to the display unit 104 and thus engage or otherwise connect the unit 104 to the user's face. In other examples, the head strap 108 can be an adjustable strap that can be adjusted to accommodate a variety of users. In some examples, the head strap 108 can be removably connected to various locations on the display unit 104. Some examples can have an attachment point or points 110 on the sides of the display unit 104 that can allow the head strap 108 to be removed, replace, or adjusted. The modularity or adjustability of the head strap can help with user comfort in a number of situations, including longer use times.

Figure 3:
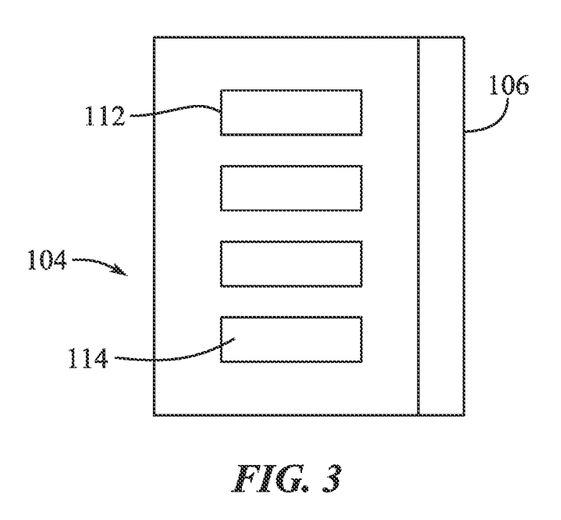
FIG. 3 illustrates a cross sectional view of an example of a head-mountable display.

Any of the features, components, and/or parts, including the arrangements and configurations thereof shown in FIGS. 1 and 2, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 1 and 2. In many examples, the display unit 104 can have a number of different components that facilitate a number of different applications. For example, FIG. 3 illustrates a cross sectional view of a display unit 104 that can have a variety of different internal components that facilitate a variety of functions. In some examples, the display unit 104 can have one or more cameras 112 located within the body of the display unit 104. The cameras 112 can be directed to the user interface portion of the display unit 104 which is exposed to a portion of the user's face, primarily the eyes and nose areas. These areas of the user's face can be covered by the HMD and surrounded by a light shield or facial interface component 106 directly interfacing with the user's skin while the cameras 112 can indirectly interface with the user within the area surrounded by the light shield or facial interface component 106.

The cameras 112 can be used to capture images of the user over time. For example, some examples may utilize the cameras 112 to capture initial images of the user before use or shortly after donning the device during use. These images can be used to create a user avatar that can digitally interface with other users on other systems. The cameras 112, in various examples, can also be used to capture changes in the user's face and facial expressions over time. For example, in some examples, the cameras 112 can be used to capture projected or deliberate emotions from the user such as surprised expressions. These images can then be subsequently transposed onto the created avatar. In accordance with many examples, the display unit 104 can also be equipped with one or more processors 114 or computer systems that can analyze and process image data for use in creating and altering the avatar. Additionally, such processors can be used to communicate with one or more other components in the system or other external systems entirely.

Any of the features, components, and/or parts, including the arrangements and configurations thereof shown in FIG. 3, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 3.

Figure 4:
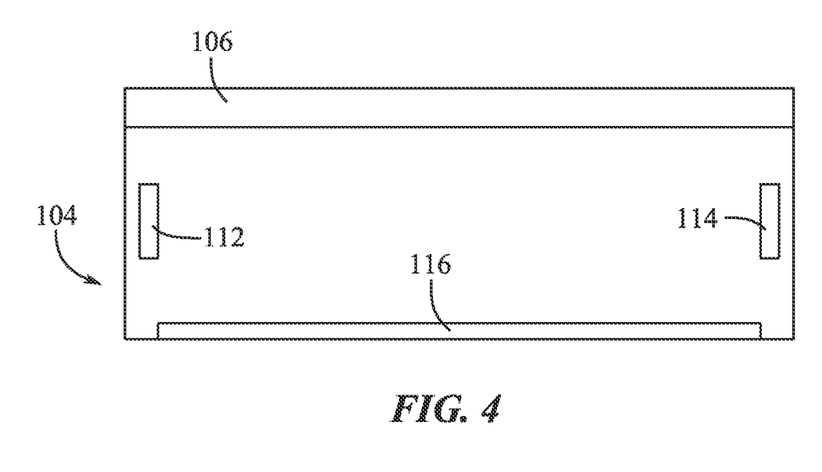
FIG. 4 illustrates a top cross sectional view of an example of a head-mountable display.

FIG. 4 shows a top view of an example of a display unit 104 of an HMD. Some examples of the display unit 104, as shown in FIG. 4, can also have an internal display screen 116 that can be located within or on the body of the display unit 104. This can allow the user to visualize an alternate reality or virtual reality based on what is displayed on the screen 116. The screen 116 can be used to communicate a variety of information to the user outside of the virtual or mixed reality. For example, some examples of the screen 116 can communicate an image of the user's digital avatar as seen and modified by the cameras 112 and processors 114 of the display unit 104. This can allow the user to determine if the avatar is accurately portraying the deliberate emotions of the user. In some examples, the user can have a separate interface system (not shown) that can allow the user to provide feedback to the processor 114 to adjust the digital image of the avatar to more accurately reflect the user. This can be done by any number of systems or subsystems of the display system 100 and can be internal, external, or both.

Any of the features, components, and/or parts, including the arrangements and configurations thereof shown in FIG. 4, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 4.

Figure 5:
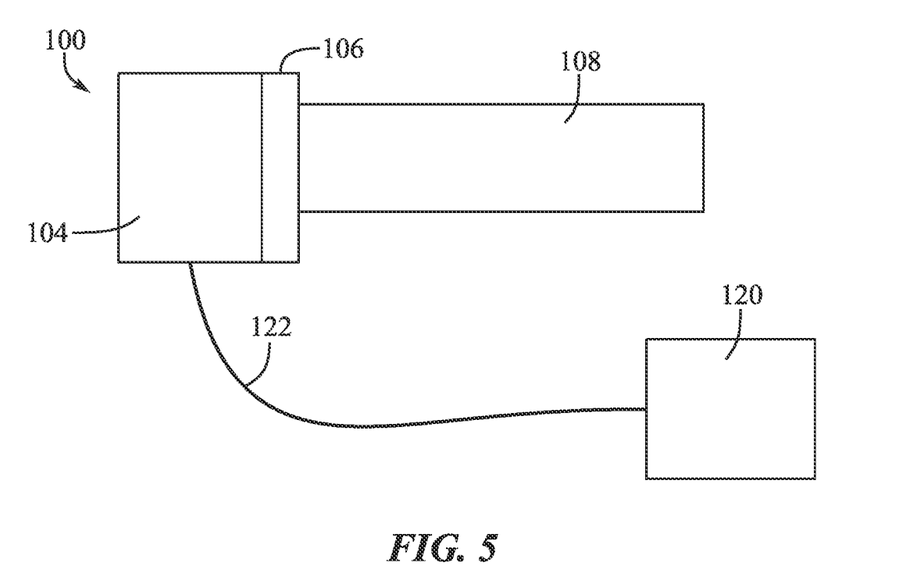
FIG. 5 illustrates an example of a head-mountable display connected to a transmission device.

FIG. 5 illustrates another example of an HMD system 100. In one example, the HMD system 100 can include a display unit 104 that can be connected to a transmitter/receiver 120. In numerous examples, the display unit can be connected to the transmitter/receiver 120 through a variety of connection protocols. Some examples can utilize a physical connection 122, as illustrated in FIG. 5. Other examples can utilize a wireless protocol type connection. Similarly, the transmitter/receiver 120 can be used to send or receive signals to and from any type of external system through similar connection protocols like wired or wireless.

Additional examples of a transmitter 120 configuration can include the use of an integrated transmitter, where the transmitter can be integrated into the display unit 104 or the head strap 108. The transmitter, similarly, can be electronically coupled to various control units or sub-systems to receive signals from an image capture system or other subsystem of the HMD. The transmitter can transmit those signals to the onboard display of the display unit 104 or to another system such as another user's display unit external and separate from the display unit 104. Additionally, the transmitter can be configured to receive signals from other external systems and relay those signals to the display unit for the user to view and interact with. Some examples can include other user's avatars or even images of the own user's avatar on a display screen. Some examples can also include unit status information such as battery life or user status.

Any of the features, components, and/or parts, including the arrangements and configurations thereof shown in FIG. 5, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 5.

Figure 6:
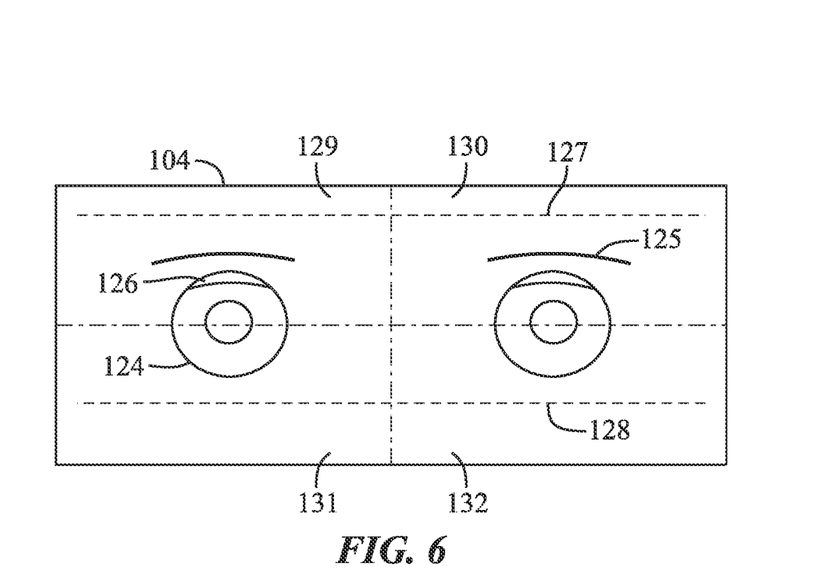
FIG. 6 illustrates an image of a user's eyes when positioned within an example of a head-mountable display.

FIG. 6 illustrates an example of how a user's eyes may be seen by the cameras and relayed back into the avatar creation. Additionally, FIG. 6 illustrates how the HMD system and the various components of the HMD system can utilize features of a user's face to adjust the avatar image to reflect the desired state of the user. For example, FIG. 6 illustrates a facial interface region surrounding the user's eyes 124. The facial interface region can be defined by a light shield or facial interface component of the display unit 104 pressing against the user's face. FIG. 6 illustrates an example of a user's eyes 124 and other facial features such as eyebrows 125, eyelids 126, upper brow line 127, and a lower eye line 128. In some examples, the display unit 104 can divide the user's image into four different quadrants such as an upper left 129, upper right 130, lower left 131, and a lower right 132. These quadrants can be used to evaluate the various facial features or datums so that the avatar image can be accurately adjusted to reflect the desired end state of the user.

For example, various examples can implement adjustments to the facial features to reflect something more in line with a reference image and can utilize the various facial quadrants and facial features to determine where and what should be adjusted. It should be understood that the reference image may be any image and may not necessarily reflect the actual image of the user. For example, some reference images can be images of a character or may be an image of another person that the user selected. In various examples, the display unit 104 can have a memory storage element that can be used to store any variety of reference image for use. Additionally, in some examples, the display unit 104 can readily be configured to capture additional images that can be used as a reference image at any time.

In many examples, the user may elect to adjust avatar to reflect something different from the reference image such as an altered image or any desired image that may have been stored in the memory storage element. It can be appreciated that users can make any number of adjustments to the image to reflect the desired avatar. For example, some images can be modified in placement of the eyebrows 125 or eye lids 126 to project an emotional state of the user onto the avatar. Other changes can be made to the color of the face or any of the facial features like the eyes and/or eyebrows that can allow the user to customize the projected avatar. This can make the use of the display unit 104 more appealing and comfortable to the end user.

Any of the features, components, and/or parts, including the arrangements and configurations thereof shown in FIG. 6, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 6.

The upper skin and musculature of the human face above the eyes tends to be tighter and less malleable as well as less susceptible to frictional forces compared to skin and musculature below the eyes. Frictional forces are a combination of a perpendicular force and the respective coefficient of friction of the different surfaces. In various examples, the HMD system 100 can exert a perpendicular force against a user's head in order to position the HMD system on the user. The resulting frictional forces can be a result of the force from the HMD and the contact between the facial interface component 106 and the user 102. Such frictional forces can be different at different locations on the face due to the structure of the face.

For example, the tissues and musculature above the eyes in the forehead region are more connected directly to the supporting skeletal structure with less adipose tissue, thus making such areas less susceptible to unintentional movement and deformation in response to external forces and pressures. Therefore, such tissues and facial structures can be more resistant to frictional forces applied to such areas. In contrast, the facial structures below the eyes tend to have a greater amount of flexible adipose tissues and looser skin, making them more susceptible to frictional forces. Naturally the face can be exposed to different frictional forces when wearing any HMD system. Accordingly, in order to reduce overall deformation of the user's face when donning an HMD device, various examples of the facial interface component can be modified to apply a greater concentration of force on the area above the eyes. Devices described herein can include features to concentrate more pressure above the eyes, for example on the forehead, compared to pressures exerted below the eyes. In this way, the devices described herein can reduce the overall deformation of the user's face.

Figure 7:
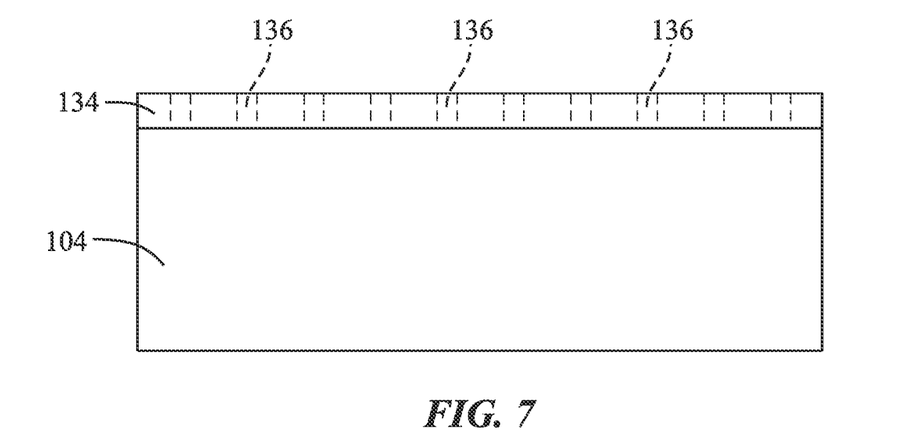
FIG. 7 illustrates an example of a head mounted display with a facial interface.

Along these lines, and in accordance with many examples, the head-mountable display unit 104 can have a facial interface component 106 that is designed to reduce or distribute the pressures from the head-mountable display unit 104 on the user's face. For example, FIG. 7 illustrates a cross sectional view of head-mountable display unit 104 with a modified facial interface component 134. In various examples, the modified facial interface component 134 can have a number of independent pressure elements 136 that can interface with an upper portion of a user's face such as the forehead above the eyes. The plurality of pressure elements 136 can be connected to the display unit 104 by any suitable means. In various examples. The pressure elements 136 can form a portion of the facial interface component that interfaces with the user's face.

These pressure elements 136 can create a pressure or frictional datum on the skin above the eyes. Additionally, the frictional datum produced from the pressure elements 136 can reduce the friction on the lower portion of the head-mountable display unit 104 on the facial tissues below the eye by redistributing the pressure or friction from the modified facial interface component 134 to the tighter tissues in the face above the eye. The multiple independent pressure elements 136 can contact the face before the lower portions of the modified facial interface component 134 does and provide a stiffer or higher friction interface with the user than the lower portion of the modified facial interface component 134. This can allow the user's lower portion of the face to move more freely without significant interference from the facial interface component while still allowing the facial interface component 134 to block out ambient light.

The friction force that can be generated from the pressure elements can result from the pressure elements 136 being made from a material that is stiffer than that of the surrounding material in the modified facial interface component 134. Some examples can have pressure elements 136 made from a rubber type material that has a higher coefficient of friction than a silicone type product that can be used for the modified facial interface component. Additionally the pressure elements 136 can be made from a solid block of material that has a higher stiffness and is less flexible than that of the surrounding material. In other words, the independent pressure elements 136 can be made of a first material with a higher stiffness and is less flexible, while the surrounding facial interface component 134 is made from a second material that is more flexible and has a lower stiffness when compared to that independent pressure elements 136. This can allow the pressure elements 136 to act as a pressure interface with the user's head above the eyes and create the frictional datum for supporting the display unit 104.

As can be appreciated, numerous examples of the pressure elements 136 can be positioned within the body of the facial interface component 134 such that when no pressure is applied to the facial interface component, the pressure elements 136 remain somewhat hidden or disguised within the facial interface component. This can provide a more aesthetically pleasing configuration to the user as well as provide protection for the pressure elements when not in use.

Figure 8:
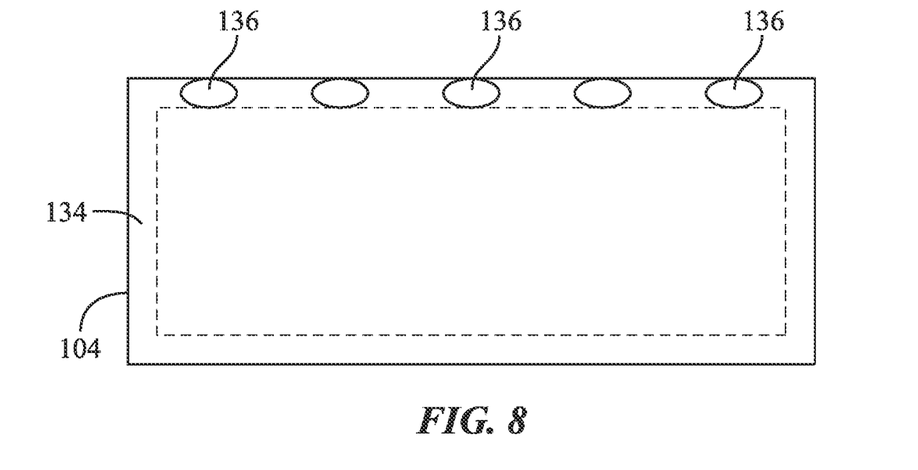
FIG. 8 illustrates a cross sectional view of an example of a head-mountable display.

FIG. 8 illustrates a front cross sectional view of a head mounted display unit 104 with a modified facial interface component 134. The modified facial interface component 134 can also have a number of pressure elements 136 positioned at different locations within the facial interface component 134. The pressure elements 136 can have any desirable configuration and can have any suitable design such that they are capable of generating a frictional or pressure datum on an upper portion of the user's face above the eyes.

Figure 9:
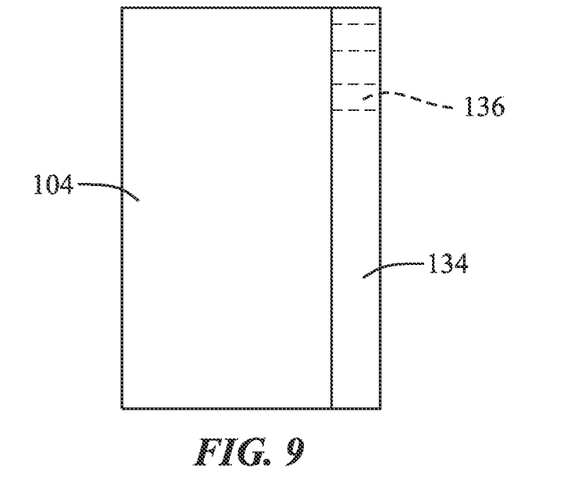
FIG. 9 illustrates a side view of an example of a head-mountable display.
Figure 10:
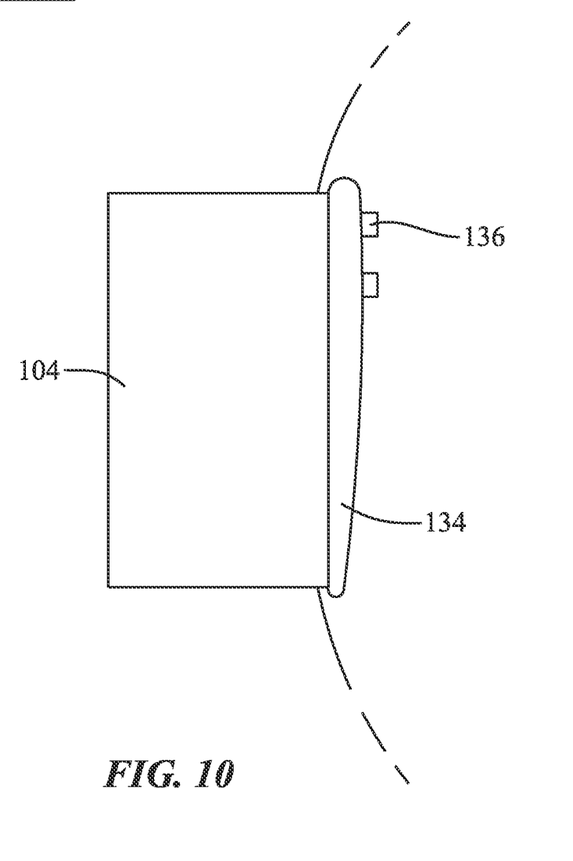
FIG. 10 illustrates an example of a head-mountable display with the compression of a facial interface.

In some examples, the pressure elements 136 can be exposed when pressure is applied through the wearing of the head-mountable display unit 104. For example, FIGS. 9 and 10 illustrate a progressive transition between a head-mountable display unit 104 at rest and in use. The head-mountable display unit 104 can have a modified facial interface component 134 that can have various integrated independent pressure elements 136. The modified facial interface component 134 can be defined by an upper portion and a lower portion, with the upper portion being near the top of the display unit 104. The independent pressure elements 136 can be integrated in the upper portion while the lower portion is left more pliable without the independent pressure elements 136. FIG. 9, for example, illustrates an example where the independent pressure elements 136 can be hidden beneath the modified facial interface component 134 when at rest. FIG. 10 illustrates the independent pressure elements 136 can be exposed when pressure is applied through wearing of the display unit 104. As can be appreciated, various examples of the independent pressure elements can be made from any type of suitable material that is comfortable for the user and capable of creating a pressure or friction datum. In some examples, the pressure elements 136 can be made from the same material as the facial interface component. In other examples, the pressure elements 136 can be made of a different material. Many examples of the facial interface component and/or the pressure elements can be made of a flexible material such as latex or rubber. Some examples may be made of various configurations of silicone.

As can be fully appreciated, the facial interface component can take on any suitable configuration that would allow it to interface with the user's face in such a way that different frictional forces are created. In the examples illustrated above, the pressure elements 136 generate a first frictional force above the eyes of the user which would naturally produce a second frictional force from the remaining portion of the facial interface component that is different and less than the frictional force created from the pressure elements. Although various examples of the facial interface component may incorporate a structural component, some examples can utilize a multi-material facial interface component that can create multiple frictional forces by the use of different types of materials and/or different configurations.

Any of the features, components, and/or parts, including the arrangements and configurations thereof shown in FIGS. 7-10, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 7-10.

Figure 11:
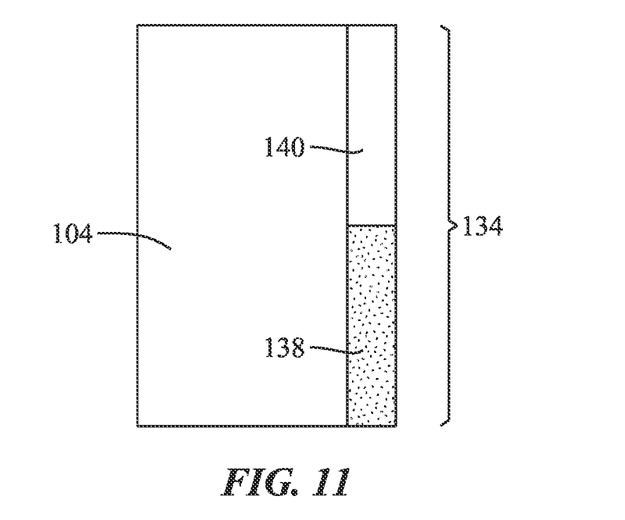
FIG. 11 conceptually illustrates the facial interface of an example of a head mounted display.

FIG. 11 illustrates a side view of a head-mountable display unit 104 with an example of a modified facial interface component 134. In some examples, the modified facial interface component 134 can have a lower portion 138 and an upper portion 140 that are made from different materials or can be made from the same material with different structural properties. For example, the display unit 104 can utilize a thicker or stiffer material for the upper portion 140 and can incorporate a different surface texture such that the upper portion 140 generates a larger frictional force above the eyes of the user. The larger frictional force above the eyes can be due to a soft silicone type material that is soft to the touch but dense enough to create the desired frictional forces.

In contrast, various examples can utilize a more flexible configuration of material on the lower portion 138 such that the flexible material does not apply as much friction to the lower more flexible portions of the user's face. Additionally, some examples may use an entirely different material on the lower portion 138. The different material can be intentionally selected to be a low friction material relative to the material of the upper portion 140. Other examples can utilize a micro-textured surface that lowers friction and encourages more movement between two surfaces, for example between the facial interface component 134 and the user's skin. As can be appreciated the variety of materials and configurations thereof can be expansive. Many examples may also be modular in that the facial interface component 134 can be removed and modified or adjusted further to allow for increased or decreased frictional forces from both the upper and/or lower portions.

Any of the features, components, and/or parts, including the arrangements and configurations thereof shown in FIG. 11, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 11.

Figure 12:
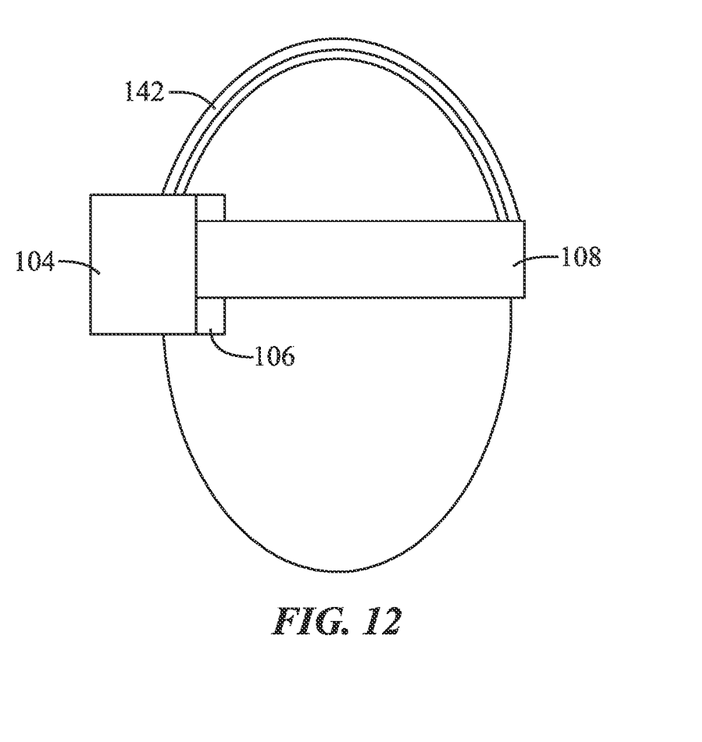
FIG. 12 illustrates an example of a head-mountable display with an overhead strap.

In addition to the head straps 108 and modified facial interface components 134 described herein, examples of a HMD systems 100 can incorporate additional head straps that can provide additional support to the display unit 104 and reduce the pressure exerted onto the face by the display unit 104. This reduction in force can result in a reduction in facial deformity when the user dons the HMD system 100. For example, FIG. 12 illustrates an example of a HMD system 100 with an auxiliary strap 142. In numerous examples, the auxiliary strap 142 can be attached to an upper portion of the display unit 104 and be configured to extend upwards over the top of the user's head and attach to a horizontal head strap 108 that can wrap around the back of the user's head when the user dons the HMD SYSTEM 100. The auxiliary strap 142 can be of any suitable configuration such as a flexible strap or it can be an adjustable strap in various examples. In some examples, the auxiliary strap 142 can be a rigid fixture that provides additional support to the head-mountable display unit 104 to relieve the pressure on the lower portion of the face of the user.

Any of the features, components, and/or parts, including the arrangements and configurations thereof shown in FIG. 12, can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 12.

As can be appreciated, the numerous examples of different mechanical features for a HMDs and facial interface components, as describe herein, can reduce or eliminate the pressure from wearing HMDs that can create unwanted changes to, or restrict the ability for the production of, full facial expressions of the user. While many examples can act to physically remove the stress and unwanted facial expressions or limitations thereto, some examples of the HMDs described herein can utilize the cameras and controllers to adjust any unwanted facial expressions in the user's avatar.

As noted above, examples of HMDs described herein can include one or more controllers electrically coupled to the cameras, transmitters, displays, and other components of the HMD. A controller can include any number of devices such as processors, computers, other digital controllers that can receive data and process the data based on a set of instructions such as software. In at least one example, the controller can include one or more processors electrically coupled to one or more memory components for storing electronic instructions that, when executed by the processor(s), cause the HMD to evaluate images captured by one or more cameras and adjust the images based on a baseline image or images as well as user input. The baseline image can be a first image, a subsequent image captured by the cameras can be a second image, and a third image displayed by the HMD can be an adjusted image based on the differences between the first image and the second image. Differences between the images can be anything from facial expressions to alterations in skin color or placement of various facial features that do not line up with the desired image.

Other examples can utilize the controller to adjust and create the third image based on a desired image from the user. The processors can adjust for unwanted emotes in the images and create an avatar that more accurately illustrates the respective and/or desired image of the user. The controller can also include one or more transmitter/receiver components configured to transmit images captured by the cameras as well as modified images of avatars to a display screen of the HMD or the display screen of another user's HMD as transmitted wirelessly. As can be appreciated, the processors, memory components, cameras, and transmitters can be used to capture, store, and/or relay any suitable information to one or more display screens of the HMD or to display screen(s) of another user's HMD.

Figure 13:
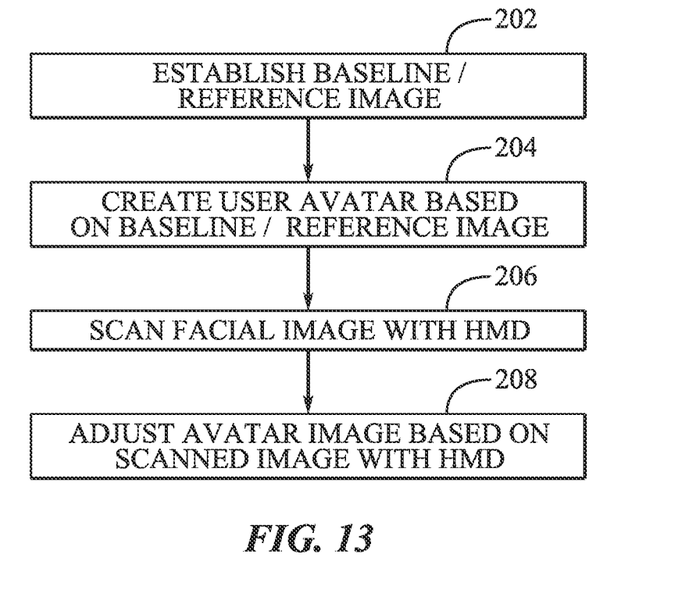
FIG. 13 illustrates a process flow diagram of an example of analyzing user facial images.

For example, FIG. 13 illustrates a process flow for utilizing cameras, processors, and software to adjust avatar expressions and images. Many examples may utilize the camera systems described herein to establish a baseline set of images 202. The base line images can be a number of different facial expressions such as happy (smiling), sad (frown), angry, upset, frustrated, neutral, etc. Additionally, the baseline image can be a reference image that can be previously taken of a user or can be any reference image that the user wishes to use. In some examples, the baseline image can be stored in a memory element of the system for use at any time. Such baseline images can be fed into the processor and can be used to create a starting point from which to create a user's avatar 204 that can similarly express the various emotional facial expressions in a manner similar to that of the user to give a realistic representation of the user, or the image can be used to create a baseline avatar of any configuration. The camera systems can be used to provide additional scans of the user's face 206 to capture additional images. These additional images can be used to update, in real time, the facial and/or emotional expressions of the associated avatar 208 or can be used to adjust the avatar to a different state, different color configurations, or any desired configuration.

Figure 14:
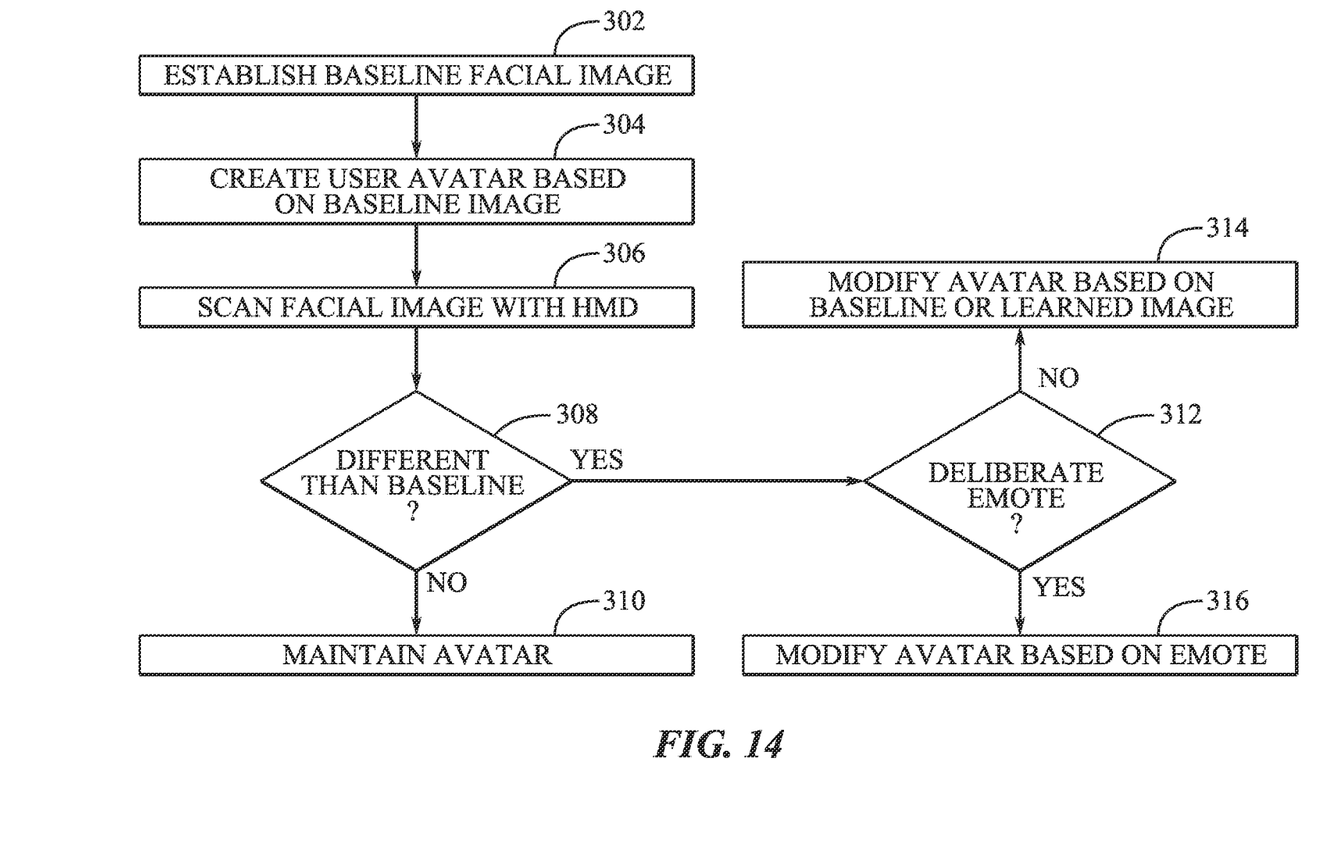
FIG. 14 illustrates a process flow diagram of an example of analyzing user facial images.

In some examples, the software, cameras, and processors can be configured to evaluate the present emotional expression of the user to determine if the changes appear to be deliberate or a result of some undesired condition. For example, FIG. 14 illustrates a process by which the cameras are used to establish a baseline of images and expressions 302. These baseline images and expressions 302 can be captured by the camera system of the HMD either before the device is donned or shortly after it is donned. The baseline images can be any number of referenced images. For example, in some examples, the reference images can be different characters or different facial expressions of characters. The baseline avatar can then be created 304 with the initial data set of images. The cameras can then continuously scan and re-scan the user's face 308 for changes in the facial expressions. If the scanned images represent no deviation from the baseline/reference images then the avatar can maintain the same set of emotional or facial expressions 310. Simultaneously, the system can evaluate whether the current facial expression is commensurate with one or more of the established baseline images 312. If it is, then the system can adjust the avatar with the known expression 314.

As can be appreciated, human facial expressions can change over time. Accordingly, many examples can be configured to store images over time such that the system can learn what images are normal or how facial expressions of the user change over time. Likewise, the avatar can be modified to utilize the updated expressions. In various examples, the system may determine that the facial expression is due to some unforeseen external force on the user's face. In this case the system can adjust the avatar based on the learned set of deliberate emotional facial expressions 316 or the referenced images. As such, many examples can adapt over time to know what expressions are deliberate and what ones are not and thus adjust the avatar accordingly.

The systems and processes illustrated in FIGS. 13 and 14 can be more fully appreciated with respect to FIG. 6. For example, FIG. 6 illustrates a baseline or reference image of a user's face within the display unit 104. This can be established by one or more images captured from the camera(s) of the display unit 104 or an input of a stored reference image that may be of the user or may be any image the user desires to use as the reference baseline image. The images can reflect the position and relative structure of the eyes 124, the eyebrows 125, the eyelids 126, as well as the upper brow line 127 and the lower eye line 127. Those additional images can reflect facial features of the actual user that may have changed due to any number of causes. Subsequently, controllers that can be coupled to the cameras can perform a comparison between the baseline/reference image(s) and the new images and determine what changes have occurred. The controller can then digitally adjust the images and create a new image that may be similar to the baseline/reference image or may reflect the new state of the user's face. The new image can then be reflected on the avatar. In other words, rather than the system capturing new images and updating the avatar automatically, the system can be configured to update based on new image data and user input. As should be appreciated, the adjusted image would not reflect an actual image of the user but an adjusted digital version that can be applied to an avatar.

In other examples, the baseline/reference image(s) may be more than one image. For example, cameras can capture a variety of baseline images of the user's face without the display unit 104 being fully applied to the user's face. This can allow the cameras to capture multiple deliberate emotional expressions or emotes of the user to be recorded and stored in a memory component. Those baseline emotion images can then be used by a controller to compare new images to in order to determine if the user is deliberately expressing an emotion or if the images are that of unwanted expressions. The controllers can then, if needed, digitally adjust the new images again to reflect the desired emotional expression of the user. Again, it can be understood that the displayed image may not be the actual image of the user, but may be a digitally modified avatar of the user to more accurately reflect the desired facial expression of the user.

In some examples, the present exemplary systems and methods capture, store, use, and/or transmit personal information data in order to operate and/or to provide a customized user experience. While such use of personal information data is not necessary to perform the exemplary systems and methods detailed above, if used, the capture, storage, use, and/or transmission of personal information data should be conducted according to well established and recognized procedures and protocols intended to prevent the unauthorized access of such personal information data.

The foregoing description used specific nomenclature to provide a thorough understanding of the various examples. However, the specific details are not required in order to practice the described examples. Therefore, the foregoing descriptions of the specific examples described herein are presented for purposes of illustration and description, and are not intended to be exhaustive or to limit the examples to the precise forms disclosed. Many modifications and variations are possible in view of the above teachings.

What is claimed is:

1. A facial interface for a head-mountable display, the facial interface, comprising:
 a body extending from a surface of a display unit, the body having an upper portion and a lower portion;
 the upper portion positioned to engage a user above an eye, the upper portion configured to exert a first frictional force; and
 the lower portion positioned to engage a user below the eye, the lower portion configured to exert a second frictional force,
 wherein the second frictional force is less than the first frictional force.

2. The facial interface of claim 1, further comprising a plurality of pressure elements disposed within the upper portion, each pressure element of the plurality of pressure elements configured to generate the first frictional force.

3. The facial interface of claim 2, wherein:
 the body includes a first material having a first stiffness; and
 the plurality of pressure elements includes a second material having a second stiffness greater than the first stiffness.

4. The facial interface of claim 1, wherein:
 the upper portion is formed from a first material; and
 the lower portion is formed from a second material.

5. The facial interface of claim 4, wherein the second material further comprises a surface texture that generates the second frictional force.

6. A wearable electronic device, comprising:
 a head-mountable display unit;
 a head strap connected to the head-mountable display unit; and
 a facial interface extending from the head-mountable display unit, the facial interface comprising:
 an upper portion including a plurality of pressure elements configured to generate a first frictional force; and
 a lower portion configured to generate a second frictional force different than the first frictional force,
 wherein the plurality of pressure generation elements each have a greater stiffness than a general stiffness of the upper portion.

7. The wearable electronic device of claim 6, wherein each pressure generation element of the plurality of pressure generation elements is configured to engage with a user's face to create a frictional datum above an eye of the user.

8. The wearable electronic device of claim 6, wherein:
 the lower portion is formed from a first material; and
 the upper portion is formed from a second material.

9. The wearable electronic device of claim 6, further comprising an auxiliary strap, the auxiliary strap comprising a first end connected to the head-mountable display unit, and a second end connected to the head strap.

10. The wearable electronic device of claim 9, wherein the auxiliary strap is configured to extend over a head.

* * * * *